United States Patent
Tae et al.

(10) Patent No.: US 9,982,938 B2
(45) Date of Patent: May 29, 2018

(54) REFRIGERATOR AND METHOD FOR CONTROLLING THE SAME

(71) Applicant: Samsung Electronics Co., Ltd, Gyeonggi-do (KR)

(72) Inventors: Eun-Ju Tae, Seoul (KR); Soog-Yeong Woo, Seoul (KR); Ju-Eun Lee, Seoul (KR); Soon-Kyu Jang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/393,197

(22) Filed: Dec. 28, 2016

(65) Prior Publication Data

US 2017/0184342 A1    Jun. 29, 2017

(30) Foreign Application Priority Data

Dec. 28, 2015    (KR) .................. 10-2015-0187259

(51) Int. Cl.
*G05B 19/00* (2006.01)
*G05B 23/00* (2006.01)
*F25D 29/00* (2006.01)
*G06K 7/10* (2006.01)

(52) U.S. Cl.
CPC .......... *F25D 29/00* (2013.01); *G06K 7/10366* (2013.01); *F25D 2700/06* (2013.01); *F25D 2700/08* (2013.01)

(58) Field of Classification Search
CPC ...... F25D 2700/08; G06Q 10/087; A23L 3/00
USPC ....................................... 340/5.61
See application file for complete search history.

(56) References Cited

U.S. PATENT DOCUMENTS

| 5,969,606 | A | * | 10/1999 | Reber | ................... | B65D 77/24 |
| | | | | | | 340/540 |
| 6,370,890 | B2 | | 4/2002 | Roh et al. | | |
| 2014/0165614 | A1 | * | 6/2014 | Manning | ............... | F25D 29/008 |
| | | | | | | 62/62 |
| 2016/0086146 | A1 | * | 3/2016 | Brown | ................. | G06Q 10/087 |
| | | | | | | 705/14.27 |

FOREIGN PATENT DOCUMENTS

| KR | 100635990 B1 | 10/2006 |
| KR | 100641974 B1 | 11/2006 |
| KR | 1020150075836 | 7/2015 |

* cited by examiner

*Primary Examiner* — Fabricio R Murillo Garcia

(57) ABSTRACT

A method for controlling a refrigerator may comprise controlling at least one of a temperature and humidity of at least one storage area of the refrigerator based on first storage information, receiving, from a second refrigerator different from the refrigerator, second storage information of the second refrigerator, and controlling at least one of the temperature and the humidity of the at least one storage area of the refrigerator based on the received second storage information.

20 Claims, 18 Drawing Sheets

REFRIGERATOR AND METHOD FOR CONTROLLING THE SAME

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Dec. 28, 2015 and assigned Serial No. 10-2015-0187259, the entire disclosure of which is incorporated herein by reference.

TECHNICAL FIELD

The present disclosure relates to refrigerators and methods for controlling the same, and more specifically, to refrigerators capable of communicating with other refrigerators and methods for controlling the same.

BACKGROUND

Vigorous development efforts are nowadays underway for refrigerators capable of communicating with other electronic devices. For example, conventional refrigerators may interwork with smartphones and may control storage environments using control signals received from the smartphones. As refrigerators happen to be able to communicate with external devices, their storage environments may be remotely controlled.

Conventional refrigerators receive control signals from external electronic devices and control storage environments based on the received control signals. Thus, upon remote control of a certain refrigerator, the user may directly enter a desired storage environment by way of, e.g., a smartphone, and the smartphone may send control signals generated based on the information entered by the user to the refrigerator. Therefore, the refrigerator may control storage environments based on the information entered by the user.

The above information is presented as background information only to assist with an understanding of the present disclosure. No determination has been made, and no assertion is made, as to whether any of the above might be applicable as prior art with regard to the present disclosure.

SUMMARY

As set forth above, when remotely controlling a refrigerator, the user conventionally enters desired information directly to a remote controller, e.g., a smartphone. Accordingly, when the user fails to grasp exact storage information required for a particular item, the item may be kept in an undesirable storage environment.

To address the above-discussed deficiencies, it is a primary object to provide a refrigerator and control method thereof may receive storage information itself from another refrigerator, and the refrigerator may be controlled by the received storage information.

According to an embodiment of the present disclosure, a method for controlling a refrigerator may comprise controlling at least one of a temperature and humidity of at least one storage area of the refrigerator based on first storage information, receiving, from a second refrigerator different from the refrigerator, second storage information of the second refrigerator, and controlling at least one of the temperature and the humidity of the at least one storage area of the refrigerator based on the received second storage information.

According to an embodiment of the present disclosure, a refrigerator may comprise a refrigerating device configured to control at least one of a temperature and humidity of at least one storage area of the refrigerator, a communication module, a processor electrically connected with the communication module and the refrigerating device, and a memory electrically connected to the processor, wherein the memory is configured to store instructions that when executed cause the processor to control the refrigerating device based on first storage information, and when second storage information is received from a second refrigerator through the communication module, control the refrigerating device based on the received second storage information.

According to an embodiment of the present disclosure, a method for controlling a refrigerator may comprise controlling a temperature and humidity of a storage area storing a first item based on first storage information, detecting an exit of the first item, receiving a first signal including information on an entrance of the first item from a second refrigerator detecting the entrance of the first item, and sending the first storage information to the second refrigerator corresponding to reception of the first signal.

According to an embodiment of the present disclosure, a refrigerator may comprise a refrigerating device configured to control at least one of a temperature and humidity of a storage area storing a first item based on first storage information, a communication module, a processor electrically connected with the communication module and the refrigerating device, and a memory electrically connected to the processor, wherein the memory is configured to store instructions that when executed cause the processor to detect an exit of the first item, and when a first signal including information on an entrance of the first item is received from a second refrigerator detecting the entrance of the first item through the communication module, control the communication module to send the first storage information to the second refrigerator corresponding to reception of the first signal.

According to an embodiment of the present disclosure, a method for controlling a refrigerator may comprise controlling a temperature and humidity of a storage area storing a first item based on first storage information, identifying the first item, detecting a variation in the first storage information for the first item, determining a second electronic device corresponding to the variation in the first storage information and a result of identifying the first item, and sending a signal including information on the variation in the first storage information to the second electronic device.

According to an embodiment of the present disclosure, a refrigerator may comprise a refrigerating device configured to control at least one of a temperature and humidity of a storage area storing a first item based on first storage information, a communication module, a processor electrically connected with the communication module and the refrigerating device, and a memory electrically connected to the processor, wherein the memory is configured to store instructions that when executed cause the processor to identify the first item, detect a variation in the first storage information for the first item, determine a second electronic device corresponding to the variation in the first storage information and a result of identifying the first item, and control the communication module to send a signal including information on the variation in the first storage information to the second electronic device.

According to embodiments of the present disclosure, a refrigerator and control method thereof may receive storage information itself from another refrigerator, and the refrigerator may be controlled by the received storage information. Thus, exact storage information may be shared between refrigerators even without the user's involvement, and thus, particular items may be kept in a preferable manner. In particular, when one item moves from one refrigerator to another, the item may be kept in a similar environment by information shared between the refrigerators.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
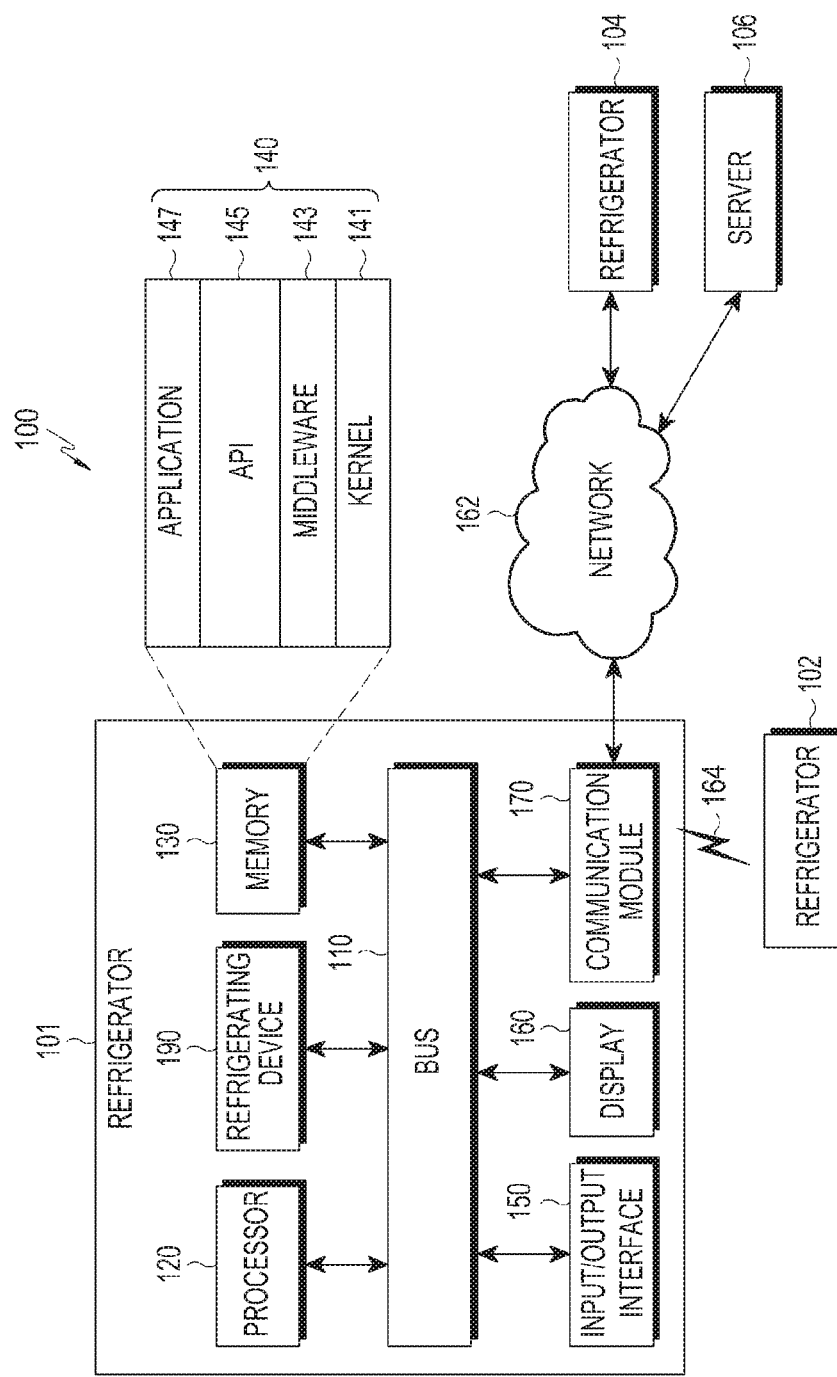
FIG. 1 illustrates a network environment including a refrigerator according to various embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Referring to FIG. 1, according to an embodiment of the present disclosure, a refrigerator 101 is included in a network environment 100. The refrigerator 101 may include a bus 110, a processor 120, a memory 130, an input/output interface 150, a display 160, a communication module 170, and a refrigerating device 190. In some embodiments, the refrigerator 101 may exclude at least one of the components or may add another component.

The bus 110 may include a circuit for connecting the components 120 to 190 with one another and transferring communications (e.g., control messages and/or data) between the components.

The processor 120 may include one or more of a central processing unit (CPU), an application processor (AP), or a communication processor (CP). The processor 120 may perform control on at least one of the other components of the refrigerator 101, and/or perform an operation or data processing relating to communication.

The memory 130 may include a volatile and/or non-volatile memory. For example, the memory 130 may store commands or data related to at least one other component of the refrigerator 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the refrigerator 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of the refrigerator 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the refrigerator 101. Further, the input/output interface 150 may output commands or data received from other component(s) of the refrigerator 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user.

For example, the communication module 170 may set up communication between the refrigerator 101 and an external device (e.g., a second refrigerator 102, third refrigerator 104, or server 106). For example, the communication module 170 may be connected with the network 162 through wireless or wired communication to communicate with the external device (e.g., the third refrigerator 104 or server 106).

The refrigerating device 190 may control at least one of the temperature and humidity of at least one storage area of the refrigerator 101. For example, the refrigerating device 190 may control a coolant reaction to adjust the temperature of at least one storage area of the refrigerator 101. For example, the refrigerating device 190 may control a coolant valve. The refrigerating device 190 may include a dehumidifier or humidifier capable of adjusting humidity.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

Each of the refrigerators 102 and 104 may be the same or different type of device than the refrigerator 101. According to an embodiment of the present disclosure, the server 106 may include a group of one or more servers. According to an embodiment of the present disclosure, all or some of operations running on the refrigerator 101 may be executed on another or multiple other refrigerators (e.g., the refrigerators 102 and 104 or server 106). According to an embodiment of the present disclosure, when the refrigerator 101 should perform some function or service automatically or at a request, the refrigerator 101, instead of executing the function or service on its own or additionally, may request another device (e.g., refrigerators 102 and 104 or server 106) to perform at least some functions associated therewith. Another refrigerator (e.g., the refrigerators 102 and 104 or server 106) may execute the requested functions or additional functions and transfer a result of the execution to the refrigerator 101. The refrigerator 101 may provide a requested function or service by processing the received result as it is or additionally. To that end, a cloud computing, distributed computing, or client-server computing technique may be used, for example.

According to an embodiment, the refrigerating device 190 may control at least one of the temperature and humidity of at least one storage area of the refrigerator 101. The memory 130 may store instructions executed to enable the processor 120 to control the refrigerating device 190 based on first storage information, and when second storage information is received through the communication module 170 from another refrigerator, control the refrigerating device 190 based on the received second storage information.

According to an embodiment, the memory 130 may store instructions executed to enable the processor 120 to detect an entrance of a first item, and the communication module 170 may receive the second storage information from the other refrigerator detecting an exit of the first item.

According to an embodiment, the memory 130 may store instructions executed to enable the processor 120 to control at least one of the temperature and humidity of a storage area that the first item enters based on the second storage information.

According to an embodiment, the communication module 170 may send a first signal including information on the entrance of the first item, and the other refrigerator may send the second storage information corresponding to reception of the first signal.

According to an embodiment, the communication module 170 may receive a second signal including information on the exit of the first item from the other refrigerator and send a third signal requesting the second storage information to the other refrigerator corresponding to reception of the second signal, and the other refrigerator may send the second storage information corresponding to reception of the third signal.

According to an embodiment, the refrigerator 101 may further include a radio frequency identification (RFID) reader (not shown) scanning a RFID tag of the first item, and the memory 130 may further store instructions executed to enable the processor 120 to detect the entrance of the first item based on a result of scanning the RFID tag.

According to an embodiment of the present disclosure, the communication module 170 may receive the second storage information from the other refrigerator detecting the exit of the first item based on the result of scanning the RFID tag of the first item.

According to an embodiment of the present disclosure, the refrigerator 101 may further include a weight sensor (not shown) detecting an increase by a first amount in weight of the at least one storage area, and the memory 130 may store instructions executed to enable the processor 120 to detect the entrance of the first item based on the increase by the first amount.

According to an embodiment of the present disclosure, the communication module 170 may receive the second storage information from the other refrigerator detecting the exit of the first item based on the detection of a decrease by the first amount.

According to an embodiment of the present disclosure, the refrigerator may further include a presence sensor (not shown) detecting presence of an item included in the refrigerator, and the memory 130 may store instructions executed to enable the processor 120 to detect the entrance of the first item at a first time based on sensing data from the presence sensor.

According to an embodiment of the present disclosure, the communication module 170 may receive the second storage information from the other refrigerator detecting the exit of the first item at a second time whose difference from the first time is a predetermined threshold or less.

According to an embodiment of the present disclosure, the second storage information may include a storage information history regarding the first item, and the memory 130 may store instructions executed to enable the processor 120 to control at least one of the temperature and humidity of at least one storage area of the refrigerator based on the storage information history regarding the first item.

According to an embodiment of the present disclosure, the second storage information may include a decomposition state regarding the first item, and the memory 130 may store instructions executed to enable the processor 120 to control at least one of the temperature and humidity of at least one storage area of the refrigerator based on the decomposition state regarding the first item.

According to an embodiment of the present disclosure, the refrigerating device 190 may control at least one of temperature and humidity of a storage area storing the first item based on first storage information. The memory 130 may store instructions executed to enable the processor 120 to detect the exit of the first item, and when receiving a first signal including information on the entrance of the first item from the other refrigerator detecting the entrance of the first item through the communication module 170, control the communication module 170 to send the first storage information to the other refrigerator corresponding to reception of the first signal.

According to an embodiment of the present disclosure, the communication module 170 may send a second signal including information on the exercise of the first item, and the first signal may correspond to the second signal and information requesting the first storage information.

According to an embodiment of the present disclosure, the refrigerating device 190 may control at least one of temperature and humidity of a storage area storing the first item based on first storage information. The memory 130 may store instructions executed to enable the processor 120 to identify the first item, detect a variation in the first storage information on the first item, determine another electronic device corresponding to the variation in the first storage information and a result of the identification of the first item, and control the communication module 170 to send a signal including information on the variation in the first storage information to the other electronic device.

Figure 2:
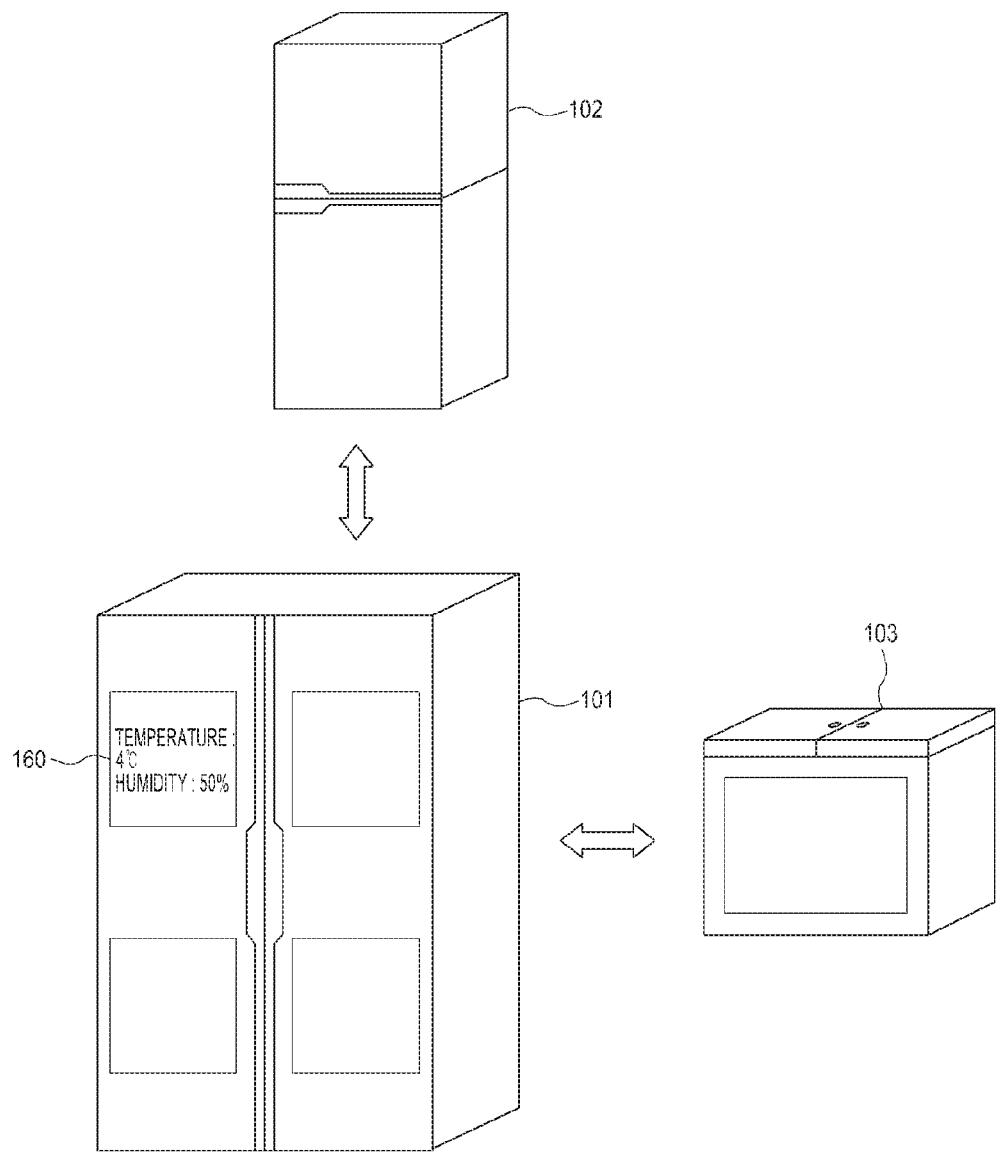
FIG. 2 illustrates a system of a plurality of refrigerators according to various embodiments of the present disclosure.

FIG. 2 is a concept view illustrating a system of a plurality of refrigerators according to an embodiment.

As shown in FIG. 2, the first refrigerator 101 may communicate with the second refrigerator 102 and the third refrigerator 103. For example, the first refrigerator 101, the second refrigerator 102, and the third refrigerator 103 may conduct short-range communication based on various communication schemes, such as wireless fidelity (Wi-Fi), ZIGBEE, BLUETOOTH, near field communication (NFC), or global navigation satellite system (GNSS). Or, although not shown, there may be a home server (not shown) for managing the first refrigerator 101, the second refrigerator 102, and the third refrigerator 103, and the first refrigerator 101, the second refrigerator 102, and the third refrigerator 103 may communicate with each other by the relaying of the home server. Or, the first refrigerator 101, the second refrigerator 102, and the third refrigerator 103 may communicate with each other using long-distance communication using a cellular communication protocol.

Figure 3:
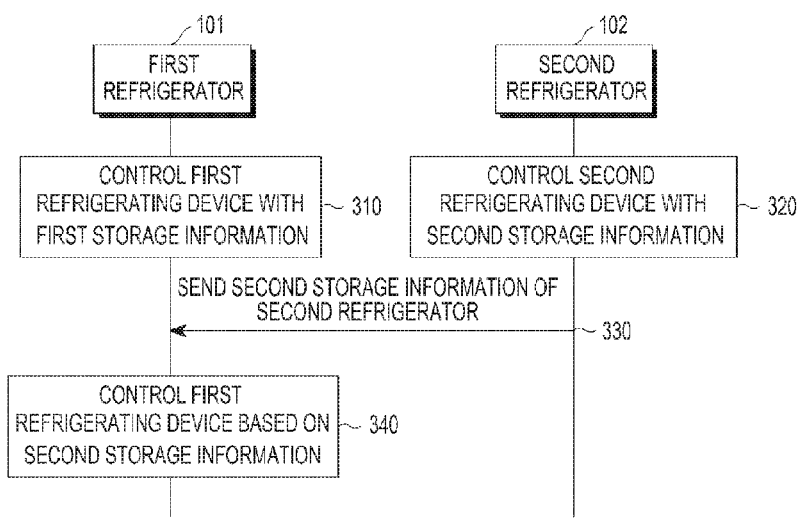
FIG. 3 illustrates a method for controlling a refrigerator according to various embodiments of the present disclosure.

FIG. 3 is a flowchart illustrating a method for controlling a refrigerator according to an embodiment.

In operation 310, the first refrigerator 101 may control a first refrigerating device with first storage information. Here, the first storage information may be information on a storage environment of the first refrigerator 101, which may include at least one of, e.g., temperature information and humidity information on at least a portion of the first refrigerator 101. The first storage information may be managed distinctively per compartment space of the first refrigerator 101, as set forth in Table 1, for example:

TABLE 1

| Compartment space | Temperature information | Humidity information |
|---|---|---|
| First refrigerating compartment | 4° C. | 15% |
| Second refrigerating compartment | 2° C. | 30% |
| Freezing compartment | −17° C. | 5% |

As described above, the first storage information may include at least one of temperature information and humidity information on at least a portion of the first refrigerator 101. Meanwhile, it may be easily appreciated by one of ordinary skill in the art that any information that may represent the state of the refrigerator may be included in the storage information, and the type of storage information is not limited. Specifically, as described below, the storage information may include a storage history.

Meanwhile, the first refrigerating device may be an electronic device capable of controlling a variation in the storage information included in the first refrigerator. For example, the first refrigerating device may be implemented as a cooler capable of changing temperature information or a dehumidifier or humidifier capable of changing humidity information. The first refrigerating device may compare current storage information with first storage information and may control the first refrigerating device based on a result of the comparison. For example, when the temperature of the first refrigerating compartment is 5° C., the first refrigerating device may control the coolant of the cooler so that the temperature is down to 4° C. that is the first storage information.

The first storage information may be a default value. Or, the first storage information may be a value determined by the user's input. In this case, the first storage information may be inputted through an input/output interface provided in the first refrigerator 101 or received via communication from another electronic device. Or, the first storage information may be a value determined by the first refrigerator 101. Specifically, the first refrigerator 101 may identify an item entering for storage and may determine the first storage information based on storage information per item.

In operation 320, the second refrigerator 102 may control a second refrigerating device with second storage information.

In operation 330, the second refrigerator 102 may send the second storage information of the second refrigerator 102 to the first refrigerator 101. The second refrigerator 102 may previously store an event for sending storage information. The second refrigerator 102 may trigger detection of the event for sending the storage information to send the second storage information to the first refrigerator 101. Here, various embodiments of the event for sending the storage information are described below in greater detail. Or, the second refrigerator 102 may periodically or aperiodically send the second storage information to the first refrigerator 101 without triggering.

In operation 340, the first refrigerator 101 may control the first refrigerating device based on the received second storage information of the second refrigerator 102. For example, the first refrigerator 101 may control the first refrigerating device so that at least a portion thereof is operated with the second storage information. Or, the first refrigerator 101 may determine that a particular item should be kept in third storage information using the second storage information. In this case, the first refrigerator 101 may control the first refrigerating device so that at least a portion thereof is operated with the third storage information.

Meanwhile, according to an embodiment of the present disclosure, the first refrigerator 101 may display contents related to the received second storage information on the display 160. For example, the first refrigerator 101 may induce the user to keep a particular item in a storage area having storage information similar to the second storage information by displaying the storage area having the similar storage information to the second storage information. Or, the first refrigerator 101 may receive information on a decomposition state of a particular item and display the decomposition state on the display 160 that are described below in detail.

Figure 4A:
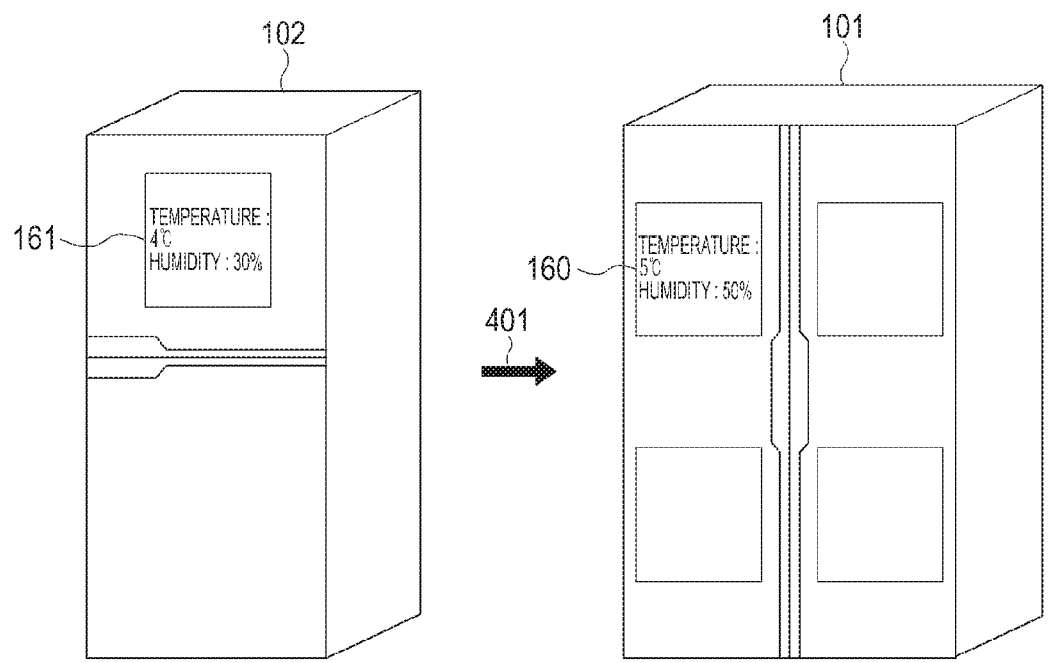
FIGS. 4A and 4B illustrate refrigerators according to various embodiments of the present disclosure.
Figure 4B:
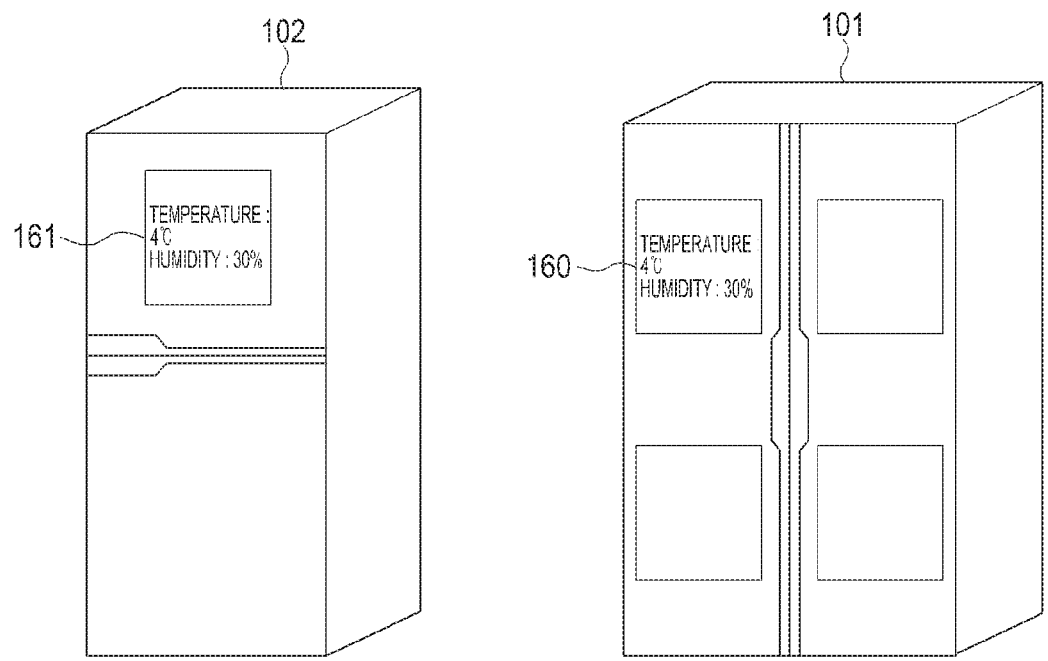

FIGS. 4A and 4B are concept views illustrating refrigerators according to embodiments of the present disclosure.

Referring to FIG. 4A, the first refrigerator 101 may operate based on the first storage information. For example, the first storage information of the first refrigerator 101 may include the temperature information of 5° C. and the humidity information of 50%. The first refrigerator 101 may control at least one of the cooler and dehumidifier or humidifier included in the first refrigerator 101 to maintain the temperature information of 5° C. and the humidity information of 50%. The first refrigerator 101 may display the first storage information on the display 160. The second refrigerator 102 may operate based on the second storage information. For example, the second storage information of the second refrigerator 102 may include the temperature information of 4° C. and the humidity information of 30%. The second refrigerator 102 may control at least one of the cooler and dehumidifier or humidifier included in the second refrigerator 102 to maintain the temperature information of 4° C. and the humidity information of 30%. The second refrigerator 102 may display the second storage information on the display 161.

Meanwhile, the second refrigerator 102 may send the second storage information 401 to the first refrigerator 101. The second refrigerator 102 may send the second storage information 401 to the first refrigerator 101 using various short-range communication schemes or send the second storage information 401 to the first refrigerator 101 by the relaying of another relaying device. Further, as described above, the second refrigerator 102 may send the second storage information 401 periodically or aperiodically or corresponding to detection the event for sending storage information.

Referring to FIG. 4B, the first refrigerator 101 may be operated using the received second storage information 401. According to an embodiment of the present disclosure, the first refrigerator 101 may control the first refrigerating device to store the item with the received second storage information 401. Thus, the storage information of the first refrigerator 101 may be changed into the temperature information of 4° C. and the humidity information of 30%, and the changed storage information may be displayed on the display 160. The first refrigerator 101 may be operated so that at least a portion thereof is maintained at the received storage information. That is, the first refrigerator 101 may sync storage information on at least a portion thereof with storage information on at least a portion of the second refrigerator 102. Thus, when an item stored in the second refrigerator 102 is relocated in the first refrigerator 101, the first refrigerator 101 may perform control so that the relocated item is kept under the same storage condition. Or, when the same type of items is distributed to the first refrigerator 101 and the second refrigerator 102, the user may determine what conditions the items are kept better under and conduct manipulation to sync storage conditions of another refrigerator with the better storage conditions.

Figure 5:
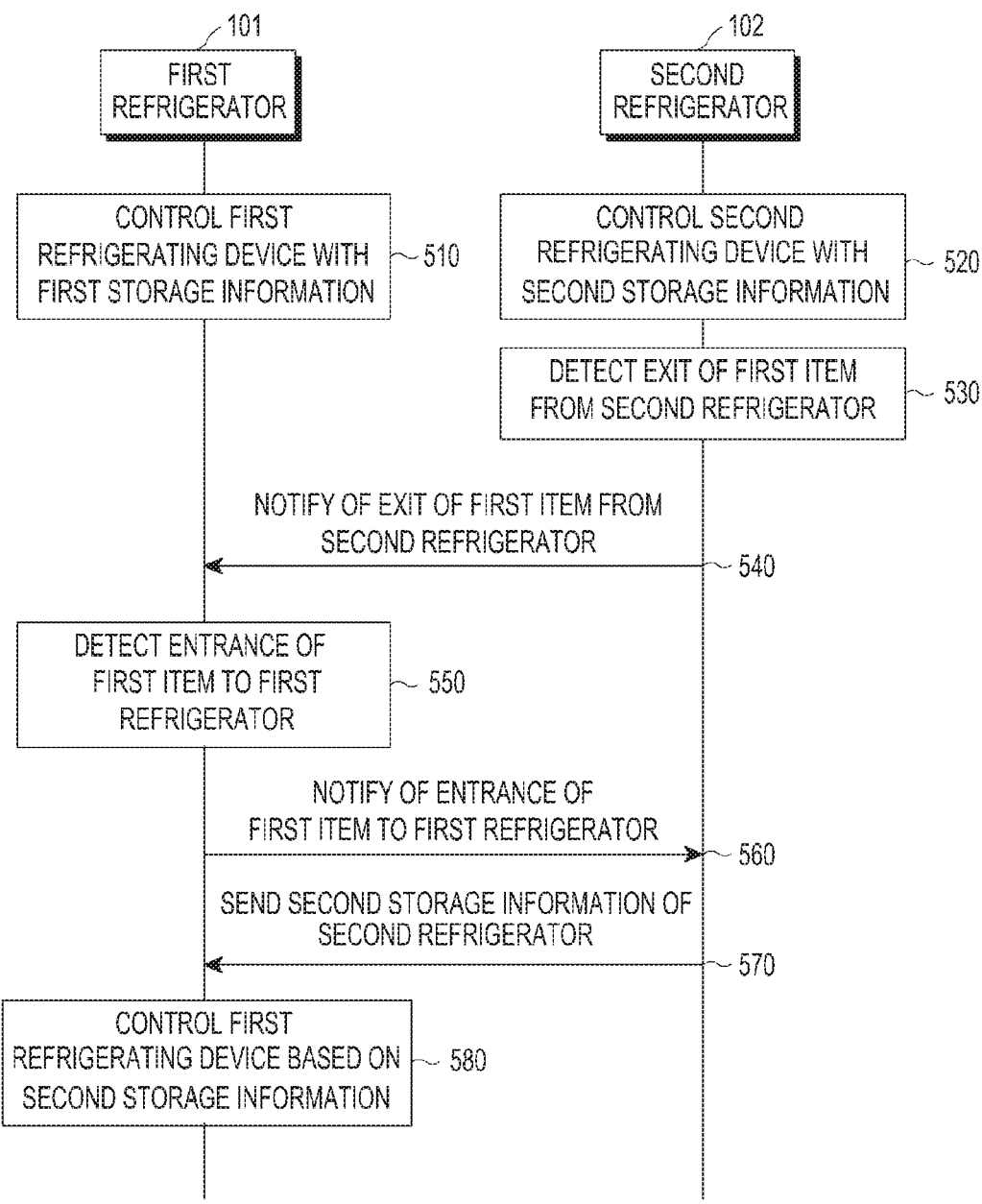
FIG. 5 illustrates a method for controlling a refrigerator according to various embodiments of the present disclosure.
Figure 6A:
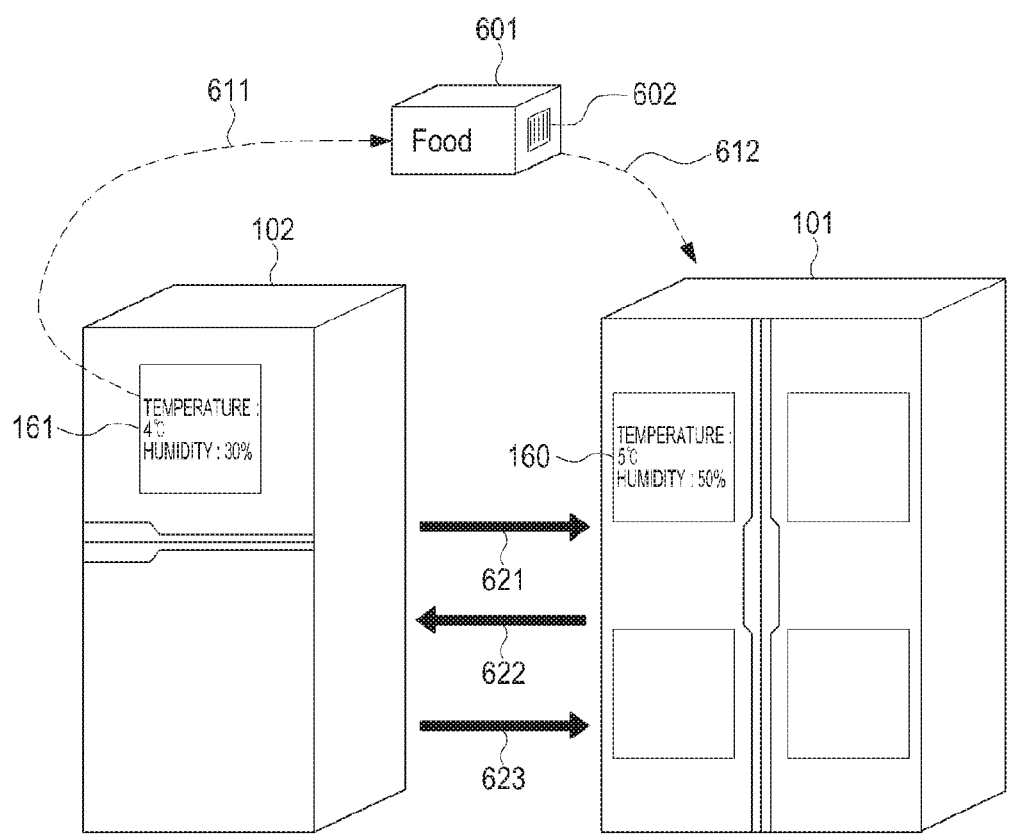
FIGS. 6A and 6B illustrate refrigerators according to various embodiments of the present disclosure.
Figure 6B:
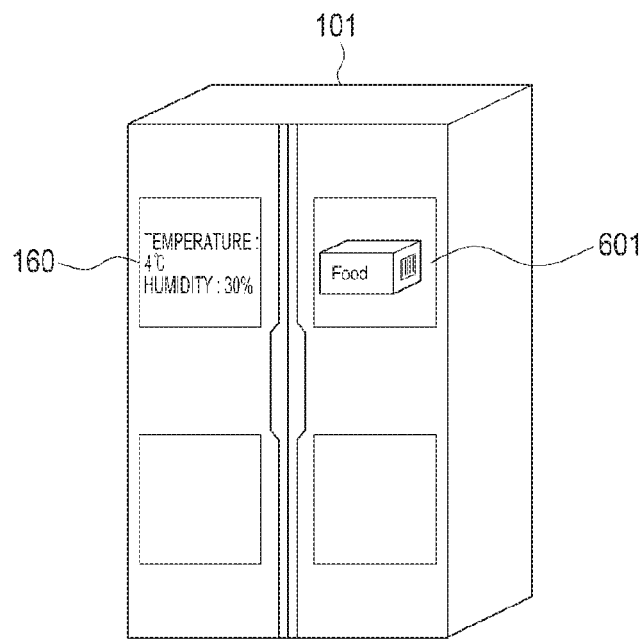

FIG. 5 is a flowchart illustrating a method for controlling a refrigerator according to an embodiment. The embodiment related to FIG. 5 is described in greater detail with reference to FIGS. 6A and 6B. FIGS. 6A and 6B are concept views illustrating refrigerators according to embodiments of the present disclosure.

In operation 510, the first refrigerator 101 may control a first refrigerating device with first storage information. In operation 520, the second refrigerator 102 may control a second refrigerating device with second storage information. For example, in the embodiment shown in FIG. 6a, the first storage information of the first refrigerator 101 may include the temperature information of 5° C. and the humidity information of 50%. The first refrigerator 101 may control at least one of the cooler and dehumidifier or humidifier included in the first refrigerator 101 to maintain the temperature information of 5° C. and the humidity information of 50%. The first refrigerator 101 may display the first storage information on the display 160. The second refrigerator 102 may operate based on the second storage information. For example, the second storage information of the second refrigerator 102 may include the temperature information of 4° C. and the humidity information of 30%. The second refrigerator 102 may control at least one of the cooler and dehumidifier or humidifier included in the second refrigerator 102 to maintain the temperature information of 4° C. and the humidity information of 30%. The second refrigerator 102 may display the second storage information on the display 161.

In operation 530, the second refrigerator 102 may detect an exit 611 of the first item 601 from the second refrigerator 102. The first item 601 may be initially kept in the second refrigerator 102. For example, the second refrigerator 102 may detect an entrance of the first item 601 and manage the first item 601. The second refrigerator 102 may detect an entrance of the first item 601 to the second refrigerator 102 by various schemes, such as detecting a RFID tag 602 of the first item 601, detecting the weight of the first item 601, or detecting presence information on the first item 601. Thereafter, the first item 601 may exit (611) from the second refrigerator 102, and the second refrigerator 102 may detect the exit 611. For example, the second refrigerator 102 may detect the exit of the first item 601 to the second refrigerator 102 by various schemes, such as detecting a RFID tag 602 of the first item 601, detecting the weight of the first item 601, or detecting presence information on the first item 601.

In operation 540, the second refrigerator 102 may notify of an exit 611 of the first item 601 from the second refrigerator 102. For example, the second refrigerator 102 may send a signal 621 including information on the exit 611 of the first item 601 as shown in FIG. 6A. The second refrigerator 102 may unicast, multicast, or broadcast the signal 621 including the information on the exit 611 of the first item 601 to the first refrigerator 101.

In operation 550, the first refrigerator 101 may detect an entrance 612 of the first item 601 to the first refrigerator 101. For example, the first refrigerator 101 may detect the entrance 612 of the first item 601 to the first refrigerator 101 by various schemes, such as detecting a RFID tag 602 of the first item 601, detecting the weight of the first item 601, or detecting presence information on the first item 601.

In operation 560, the first refrigerator 101 may notify of an entrance 612 of the first item 601 to the first refrigerator 101. For example, the first refrigerator 101 may send a signal 622 including information on the entrance 612 of the first item 601 to the first refrigerator 101. The first refrigerator 101 may unicast, multicast, or broadcast the signal 622 to the second refrigerator 102 having notified of the exit 611 of the first item 601.

According to an embodiment of the present disclosure, the first refrigerator 101 may send a request for immediate storage to the second refrigerator 102 having notified of the exit 611 of the first item 601 corresponding to the entrance 612 of the first item 601. That is, according to an embodiment of the present disclosure, the signal 622 may include information to request storage information of the second refrigerator 102 without including the information on the entrance 612 to the first refrigerator 101.

In operation 570, the second refrigerator 102 may send the second storage information of the second refrigerator 102. The second refrigerator 102 may send the second storage information 623 to the first refrigerator 101 having notified of the entrance 612 for the first item 601 from which the exit 611 has been detected. According to an embodiment of the present disclosure, when the signal 622 includes information to request storage information of the second refrigerator 102, the second refrigerator 102 may send the second storage information 623 to the first refrigerator 101 corresponding to reception of the signal 622.

In operation 580, the first refrigerator 101 may control the first refrigerating device based on the received second storage information 623. For example, as shown in FIG. 6b, the first refrigerator 101 may control at least one of the cooler and dehumidifier or humidifier included in the first refrigerator 101 so that at least a portion thereof maintains the temperature information of 4° C. and the humidity information of 30% that are the second storage information 623. The first refrigerator 101 may determine an area that the first item 601 enters and may control the first refrigerating device so that the determined entrance area is maintained as the second storage information 623. As described above, when an item moves from one refrigerator to another, it may be kept under the same storage condition even without the user's involvement.

Figure 7:
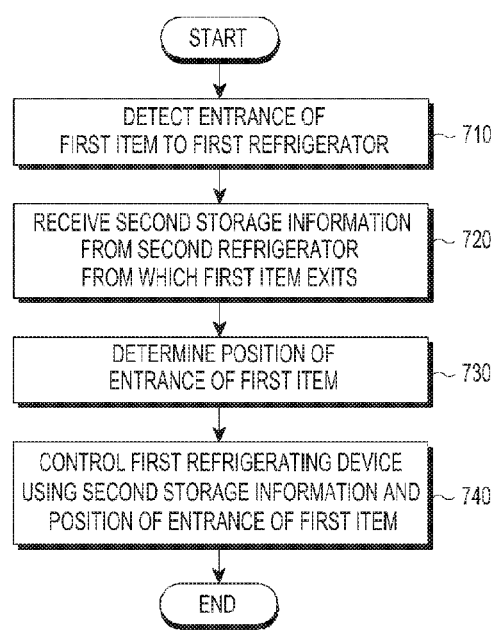
FIG. 7 illustrates a method for controlling a first refrigerator according to various embodiments of the present disclosure.

FIG. 7 is a flowchart illustrating a method for controlling a first refrigerator according to an embodiment.

In operation 710, the first refrigerator 101 may detect an entrance of a first item to the first refrigerator 101. As described above, the first refrigerator 101 may detect the entrance of the first item based on various schemes, such as detecting a RFID of the first item, weight information on the first item, or presence information on the first item.

In operation 720, the first refrigerator 101 may receive second storage information from the second refrigerator 102 from which the first item has exited. As described above, the first refrigerator 101 may previously receive information on the exit of the first item from the second refrigerator 102 and may send a request for storage information to the second refrigerator 102 using the received exit information. The second refrigerator 102 may send the second storage information to the first refrigerator 101 corresponding to the request for storage information. According to an embodiment of the present disclosure, the first refrigerator 101 may notify at least one refrigerator including the second refrigerator 102 of the entrance of the first item. The second refrigerator 102 detects the exit of the first item and provides the second storage information to the first refrigerator 101 having notified of the entrance of the first item.

In operation 730, the first refrigerator 101 may determine the position of the entrance of the first item. For example, the first refrigerator 101 may include a plurality of storage areas and may determine the storage area that the first item enters.

In operation 740, the first refrigerator 101 may control the first refrigerating device using the position of entrance of the first item and the second storage information. For example, the first refrigerator 101 may control the first refrigerating device so that the storage area that the first item is determined to enter among the plurality of storage areas is maintained as the second storage information.

Figure 8:
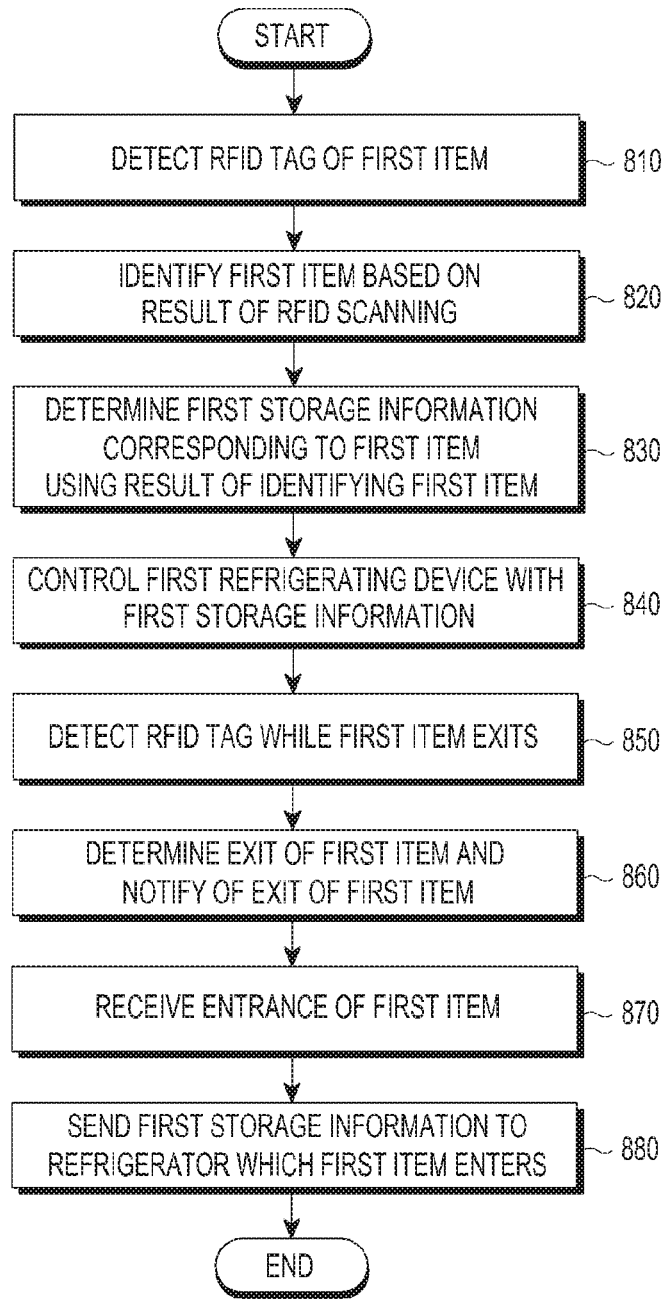
FIGS. 8, 9 and 10 illustrate a method for detecting an entrance or exit of an item according to various embodiments of the present disclosure.
Figure 9:
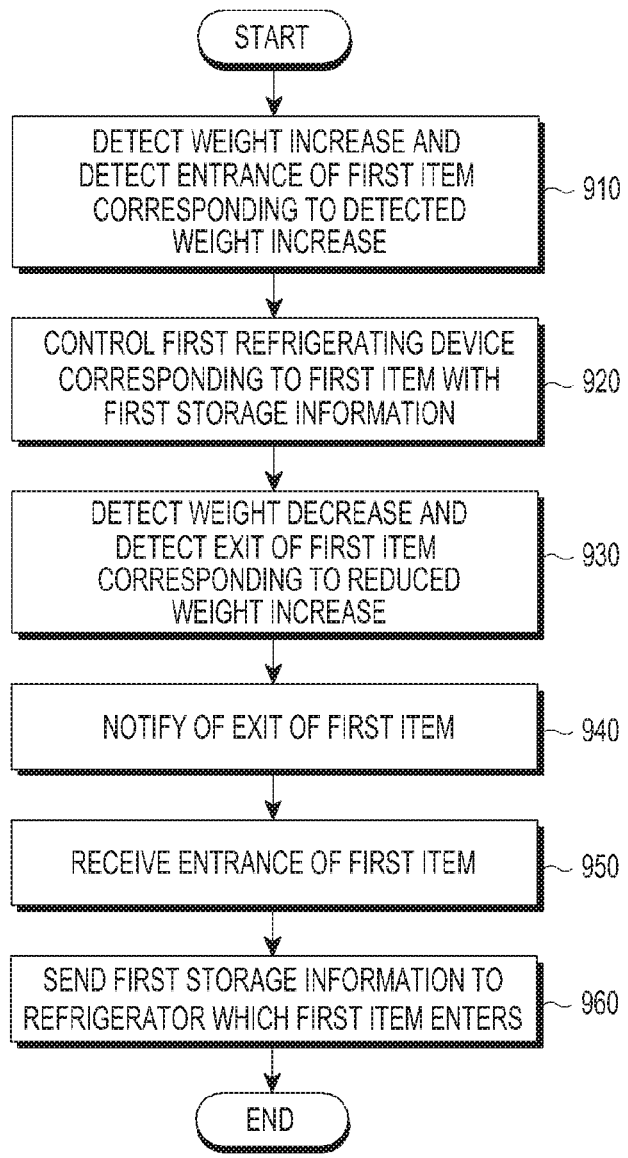
Figure 10:
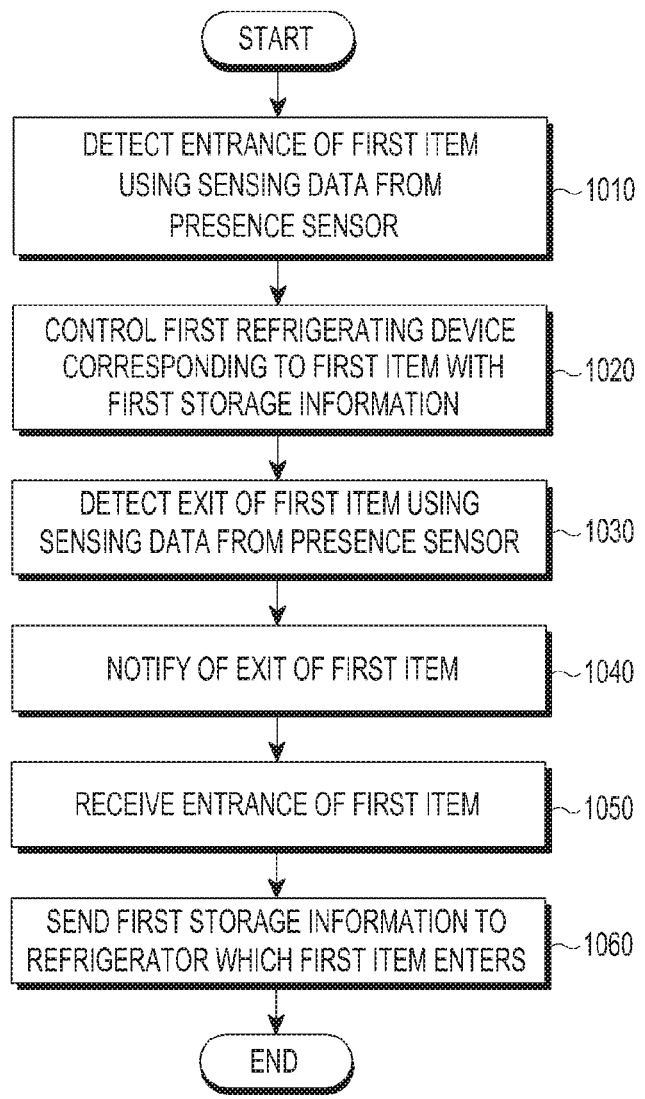

FIGS. 8 to 10 are flowcharts illustrating a method for detecting an entrance or exit of a first item according to an embodiment.

Referring to FIG. 8, in operation 810, the first refrigerator 101 may detect a RFID tag of the first item. For example, the first refrigerator 101 may include a RFID reader capable of reading RFID tags. The first refrigerator 101 may include the RFID reader at a position where it may read the RFID tag when the item enters. The RFID reader may scan the RFID tag attached on the item.

In operation 820, the first refrigerator 101 may identify the first item based on a result of RFID scanning. The first refrigerator 101 may identify the first item using information included in the RFID tag. For example, the first refrigerator 101 may identify information, such as type, expiration date, or manufacture date of the first item.

In operation 830, the first refrigerator 101 may determine first storage information corresponding to the first item using the result of identifying the first item. The first refrigerator 101 may previously store association information between the item's identification information and storage information. For example, the first refrigerator 101 may store association information as shown in Table 2.

TABLE 2

| Type of item | Temperature information | Humidity information |
|---|---|---|
| Potato | 5° C. | 20% |
| Onion | 3° C. | 30% |
| Beef | −2° C. | 40% |

For example, the first refrigerator 101 may identify that the first item is a potato and the manufacture date is Dec. 4, 2015. The first refrigerator 101 may identify the temperature information of 5° C. and the humidity information of 20% that are storage information corresponding to the potato.

In operation 840, the first refrigerator 101 may control a first refrigerating device with the identified first storage information. For example, the first refrigerator 101 may control the first refrigerating device of the first refrigerator 101 to maintain the temperature information of 5° C. and the humidity information of 20% that are storage information corresponding to the potato. According to an embodiment of the present disclosure, the first refrigerator 101 may control the first refrigerating device of the first refrigerator 101 so that the area where the potato is kept maintains the temperature information of 5° C. and the humidity information of 20%. According to an embodiment of the present disclosure, the first refrigerator 101 may determine that a plurality of items enter a particular area. The first refrigerator 101 may determine the first storage information on the first storage area using the storage information of each of the plurality of items. For example, the first refrigerator 101 may determine that the potato, onion, and beef enter the first storage area. The first refrigerator 101 may determine the first storage information using a result of computation of the storage information of each of the plurality of items. Or, the first refrigerator 101 may determine the first storage information using the priority of the storage information of each of the plurality of items.

In operation 850, the first refrigerator 101 may detect a RFID tag while the first item exits. In operation 860, the first refrigerator 101 may determine the exit of the first item and notify of the exit of the first item. According to an embodiment of the present disclosure, the first refrigerator 101 may store a history for the exit of the first item rather than notifying of the exit of the first item.

In operation 870, the first refrigerator 101 may receive the entrance of the first item from another refrigerator. The other refrigerator may also include a RFID reader and may detect an entrance of the first item using a result of RFID scanning. According to an embodiment of the present disclosure, the first refrigerator 101 may receive a request for first storage information from the other refrigerator.

In operation 880, the first refrigerator 101 may send the first storage information to the refrigerator that the first item has entered. The refrigerator receiving the first storage information may be operated using the first storage information.

Referring to FIG. 9, in operation 910, the first refrigerator 101 may detect an increase in weight and detect an entrance of the first item corresponding to the detected increase in weight. The first refrigerator 101 may include a weight sensor capable of detecting an increase in weight. In operation 920, the first refrigerator 101 may control a first refrigerating device corresponding to the first item with first storage information. In operation 930, the first refrigerator 101 may detect a decrease in weight and detect an exit of the first item corresponding to the detected decrease in weight. For example, the first refrigerator 101 may store a history for weight increase or decrease and may accordingly manage an entrance or exit of an item. Table 3 shows an example of the history for weight increase or decrease according to an embodiment of the present disclosure.

TABLE 3

| Time | Weight increase/decrease information | Item management information |
|---|---|---|
| 2015 Dec. 3 13:20 | +200 g | Entrance of first item |
| 2015 Dec. 3 12:30 | +500 g | Entrance of second item |
| 2015 Dec. 3 15:30 | +430 g | Entrance of third item |
| 2015 Dec. 3 16:30 | −500 g | Exit of second item |
| 2015 Dec. 3 18:10 | −200 g | Exit of first item |
| 2015 Dec. 3 18:30 | +600 g | Entrance of fourth item |

The first refrigerator 101 may determine an entrance or exit of an item using a history for an increase/decrease in weight as set forth in Table 3. For example, the first refrigerator 101 may determine an exit of the first item at 18:10, Dec. 3, 2015.

In operation 940, the first refrigerator 101 may notify of an exit of the first item. In this case, the first refrigerator 101 may send a signal including weight increase/decrease information, e.g., information indicating a 500 g decrease in weight to another refrigerator. According to an embodiment of the present disclosure, the first refrigerator 101 may store a history of the exit of the first item without sending signal.

In operation 950, the first refrigerator 101 may receive the entrance of the first item from another refrigerator. For example, the first refrigerator 101 may receive a signal including indicating a 500 g increase in weight from the other refrigerator. The other refrigerator may detect the 500 g increase in weight and send a signal including information indicating the increase/decrease in weight to the first refrigerator 101. According to an embodiment of the present disclosure, the first refrigerator 101 may make comparison with a 500 g decrease in weight corresponding to reception of the signal including the information on the 500 g increase in weight and determine an entrance of the corresponding item, i.e., the first item, to the other refrigerator.

In operation 960, the first refrigerator 101 may send the first storage information to the refrigerator that the first item has entered. The refrigerator receiving the first storage information may be operated using the first storage information.

Referring to FIG. 10, in operation 1010, the first refrigerator 101 may detect an entrance of the first item using sensing data from a presence sensor. The presence sensor may include a sensor capable of determining the presence or absence of an item by various schemes, such as infrared (IR)-based sensor, laser sensor, or light sensor.

In operation 1020, the first refrigerator 101 may control a first refrigerating device corresponding to the first item with first storage information. In operation 1030, the first refrigerator 101 may detect an exit of the first item using sensing data from a presence sensor. For example, the first refrigerator 101 may manage the history for entrance and exit of an item as shown in Table 4.

TABLE 4

| Time | Location information | Item management information |
|---|---|---|
| 2015 Dec. 3 13:20 | First refrigerating compartment, (a, b) | Entrance of first item |

TABLE 4-continued

| Time | Location information | Item management information |
|---|---|---|
| 2015 Dec. 3 12:30 | First refrigerating compartment, (c, d) | Entrance of second item |
| 2015 Dec. 3 15:30 | Second refrigerating compartment, (e, f) | Entrance of third item |
| 2015 Dec. 3 16:30 | First refrigerating compartment, (c, d) | Exit of second item |
| 2015 Dec. 3 18:10 | First refrigerating compartment, (a, b) | Exit of first item |
| 2015 Dec. 3 18:30 | Second refrigerating compartment, (g, h) | Entrance of fourth item |

The first refrigerator 101 may determine an entrance or exit of an item corresponding to location information. For example, the first refrigerator 101 may determine an exit of the first item based on sensing information regarding an exit at position (a,b) in the first refrigerating compartment at 18:10, Dec. 3, 2015.

In operation 1040, the first refrigerator 101 may notify of an exit of the first item. The first refrigerator 101 may send a signal including the time of exit of the first item, e.g., time information indicating 18:10, Dec. 3, 2015.

In operation 1050, the first refrigerator 101 may receive the entrance of the first item. For example, another refrigerator may identify the entrance of the item using sensing data from a presence sensor. The other refrigerator may determine the time of entrance of the item, e.g., 18:11, Dec. 3, 2015. The other refrigerator may compare the entrance time of the item with the time of exit from the first refrigerator 101. When determining that the difference between the entrance time of the item and the time of exit from the first refrigerator 101 is a predetermined threshold, the other refrigerator may determine that the entering item has moved from the first refrigerator 101. According to an embodiment of the present disclosure, the other refrigerator may send a signal including the time of entrance, e.g., time information indicating 18:11, Dec. 3, 2015, to the first refrigerator 101. In this case, the first refrigerator 101 may determine that the difference between the exit time of the first item and the received entrance time is less than a predetermined threshold and may accordingly determine that the item entering the other refrigerator is the first item that has exited.

In operation 1060, the first refrigerator 101 may send the first storage information to the refrigerator that the first item has entered. The refrigerator receiving the first storage information may be operated using the first storage information.

According to an embodiment of the present disclosure, the first refrigerator 101 may determine an entrance or exit of an item using any one of the methods described above in connection with FIGS. 8 to 10. Alternatively, the first refrigerator 101 may determine an entrance or exit of an item using a combination of at least two of the embodiments described above in connection with FIGS. 8 to 10.

Figure 11:
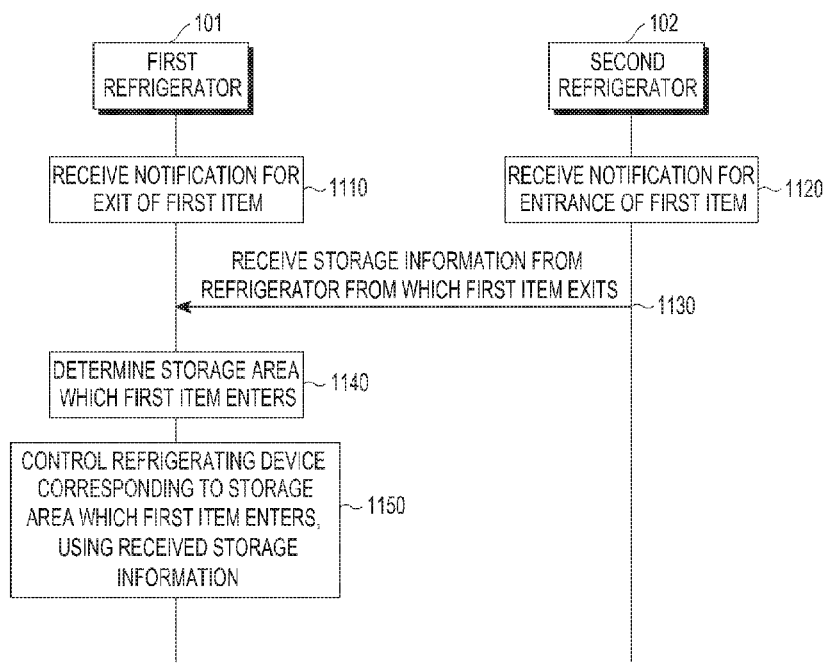
FIG. 11 illustrates a method for controlling a refrigerator according to various embodiments of the present disclosure.

FIG. 11 is a flowchart illustrating a method for controlling a refrigerator according to an embodiment.

In operation 1110, the first refrigerator 101 may receive a notification for an exit of the first item from the second refrigerator 102. In operation 1120, the first refrigerator 101 may detect and notify of the entrance of the first item.

In operation 1130, the first refrigerator 101 may receive storage information from the refrigerator from which the first item has exited. For example, the second refrigerator 102 may send storage information for the first item to the first refrigerator 101 corresponding to the notification for the entrance of the first item of the first refrigerator 101. Or, the first refrigerator 101 may send a request for storage information for the first item to the second refrigerator 102 and receive the storage information from the second refrigerator 102, corresponding to the notification for the exit of the first item received from the second refrigerator 102 and the entrance of the first item.

In operation 1140, the first refrigerator 101 may determine the storage area that the first item enters. For example, the first refrigerator 101 may include a plurality of storage areas and may determine the storage area that the first item enters among the plurality of storage areas. The first refrigerator 101 may determine the storage area that the first item enters by various schemes, such as position where RFID tag is scanned, weight detection, or sensing data from a presence sensor, as described above. In operation 1150, the first refrigerator 101 may control the refrigerating device corresponding to the storage area that the first item enters, using the received storage information. According to an embodiment of the present disclosure, the first refrigerator 101 may control, the refrigerating device considering both the received first item storage information and storage information on items used to be kept in an existing storage area.

Figure 12:
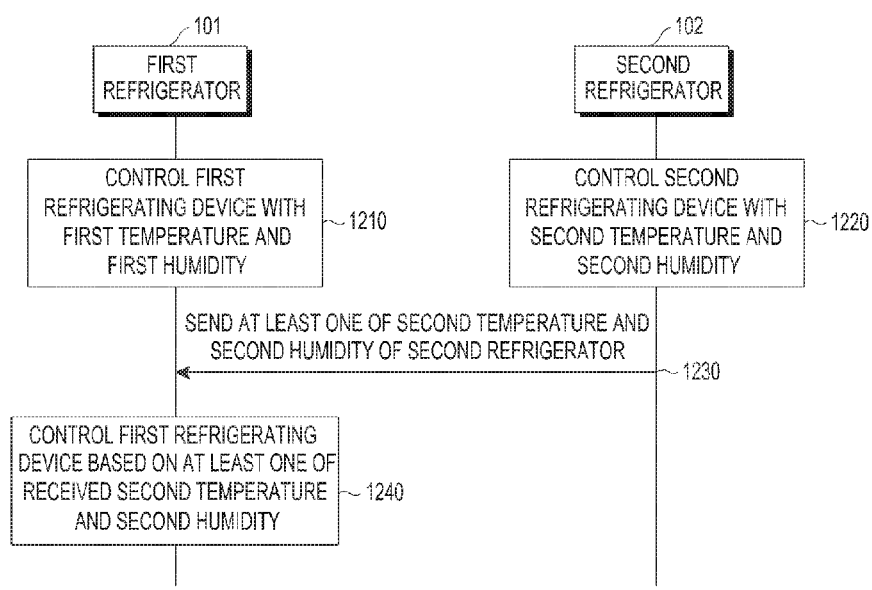
FIG. 12 illustrates a method for controlling a refrigerator according to various embodiments of the present disclosure.

FIG. 12 is a flowchart illustrating a method for controlling a refrigerator according to an embodiment.

In operation 1210, the first refrigerator 101 may control the first refrigerating device with a first temperature and first humidity. In operation 1220, the second refrigerator 102 may control the second refrigerating device with a second temperature and second humidity. In operation 1230, the second refrigerator 102 may send at least one of the second temperature and second humidity of the second refrigerator. In operation 1240, the first refrigerator 101 may control the first refrigerating device based on at least one of the received second temperature and second humidity. For example, the first refrigerator 101 may control the first refrigerating device so that at least one area reaches the second temperature. Or, the first refrigerator 101 may control the first refrigerating device so that at least one area reaches a third temperature computed considering the first temperature and the second temperature. Or, the first refrigerator 101 may control the first refrigerating device so that at least one area reaches the second humidity. Or, the first refrigerator 101 may control the first refrigerating device so that at least one area reaches a third humidity computed considering the first humidity and the second humidity.

Figure 13:
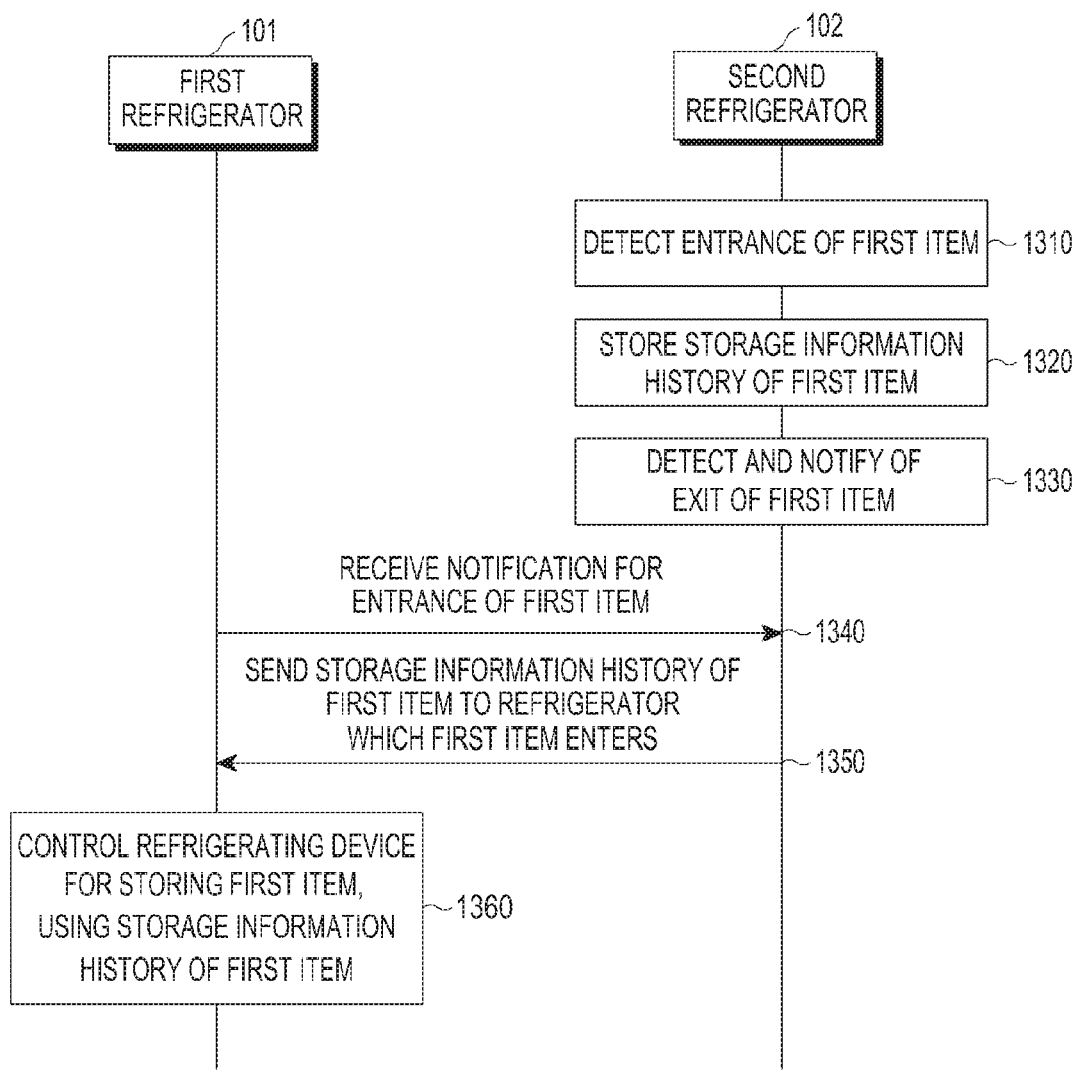
FIG. 13 illustrates a method for controlling a refrigerator according to various embodiments of the present disclosure.
Figure 14:
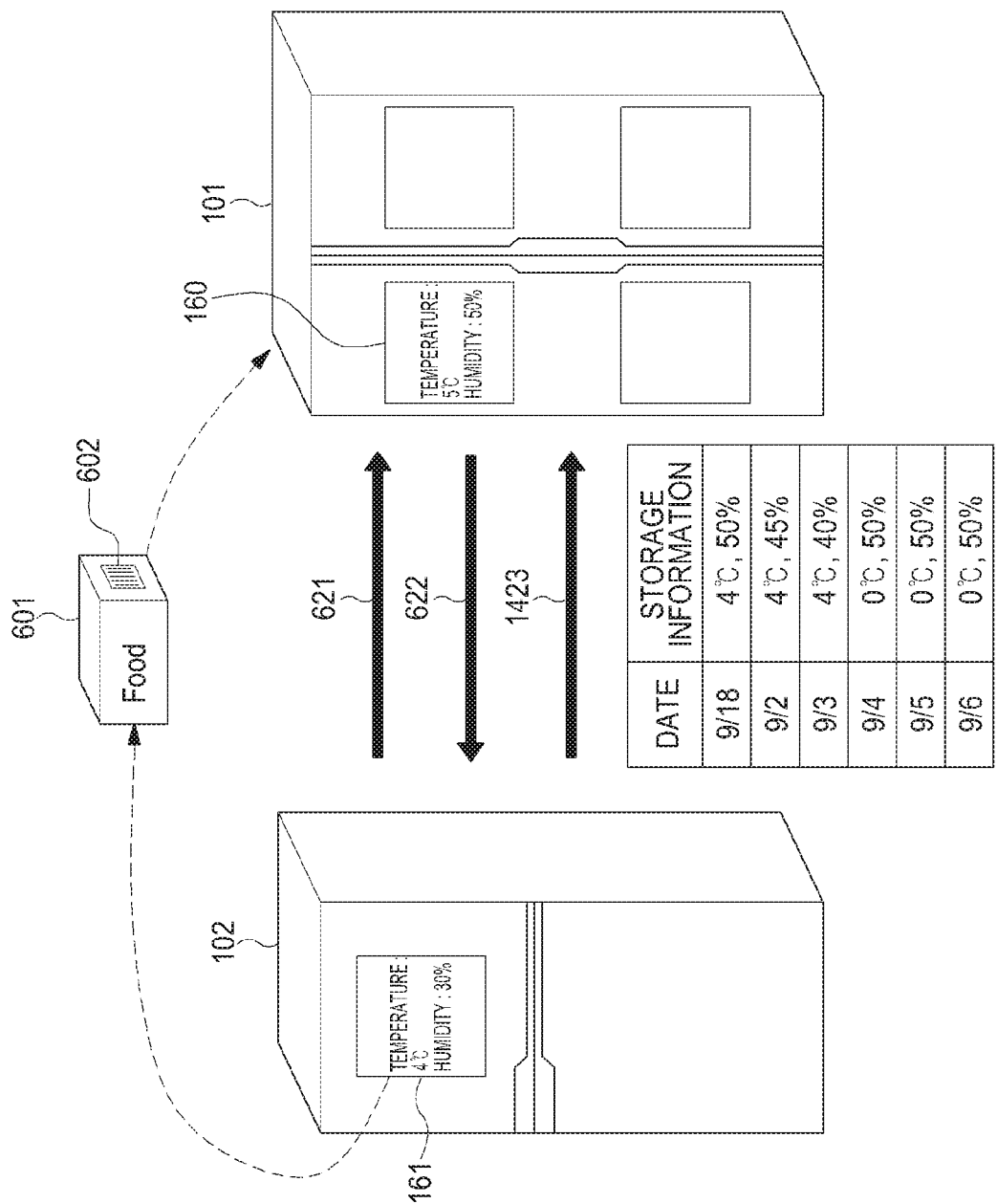
FIG. 14 illustrates an operation of a refrigerator according to various embodiments of the present disclosure.

FIG. 13 is a flowchart illustrating a method for controlling a refrigerator according to an embodiment. The embodiment related to FIG. 13 is described in greater detail with reference to FIG. 14. FIG. 14 is a concept view illustrating an operation of a refrigerator according to an embodiment of the present disclosure.

In operation 1310, the second refrigerator 102 may detect an entrance of the first item. The second refrigerator 102 may have the first item 601 enter as shown in FIG. 14.

In operation 1320, the second refrigerator 102 may store a storage information history for the first item. For example, as shown in FIG. 14, the second refrigerator 102 may store a storage information history 1423 including per-date storage information. Although FIG. 14 illustrates that the storage information history 1423 is managed per date, the unit of time is not limited thereto. Further, although FIG. 14 illustrates that the storage information includes temperature information and humidity information, this is merely an example.

In operation 1330, the second refrigerator 102 may detect and notify of an exit 611 of the first item 601. For example, as shown in FIG. 14a, the second refrigerator 102 may send a signal 621 including information indicating the exit 611 of the first item 601.

In operation 1340, the second refrigerator 102 may receive a signal 622 indicating an entrance 612 of the first item 601. In operation 1350, the second refrigerator 102 may send a storage information history 1423 for the first item to the refrigerator that the first item has entered.

In operation 1360, the first refrigerator 101 may control the refrigerating device for storing the first item, using the storage information history 1423 for the first item. For example, the first refrigerator 101 may identify the first item 601 and read out its corresponding storage information previously stored. The previously stored storage information may be information on per-time storage information set for each item type, and examples thereof are shown in Table 5 below.

TABLE 5

| Type of item | Time information | storage information |
| --- | --- | --- |
| Yogurt | First day | 4° C., 50% |
| | Second day | 4° C., 45% |
| | Third day | 4° C., 40% |
| | Fourth day | 0° C., 50% |
| | Fifth day | 0° C., 50% |
| | Sixth day | 0° C., 50% |
| | Seventh day | 0° C., 50% |
| | Eighth day | 0° C., 50% |
| | Ninth day | 2° C., 50% |
| | Tenth day | 3° C., 50% |
| | Eleventh day | 4° C., 50% |

According to an embodiment of the present disclosure, the first refrigerator 101 may previously store or receive the storage information as shown in Table 4 from another electronic device. The first refrigerator 101 may compare the previously stored storage information with the storage information history 1423 received from the second refrigerator 102 and control the refrigerating device based on a result of the comparison. For example, the first refrigerator 101 may determine that the storage information for six days from September 1 corresponds to the first day to sixth day of the previously stored storage information and may control the refrigerating device so that the storage information on the seventh day and its subsequent days are maintained. As set forth supra, a particular item may be continuously stored.

Figure 15:
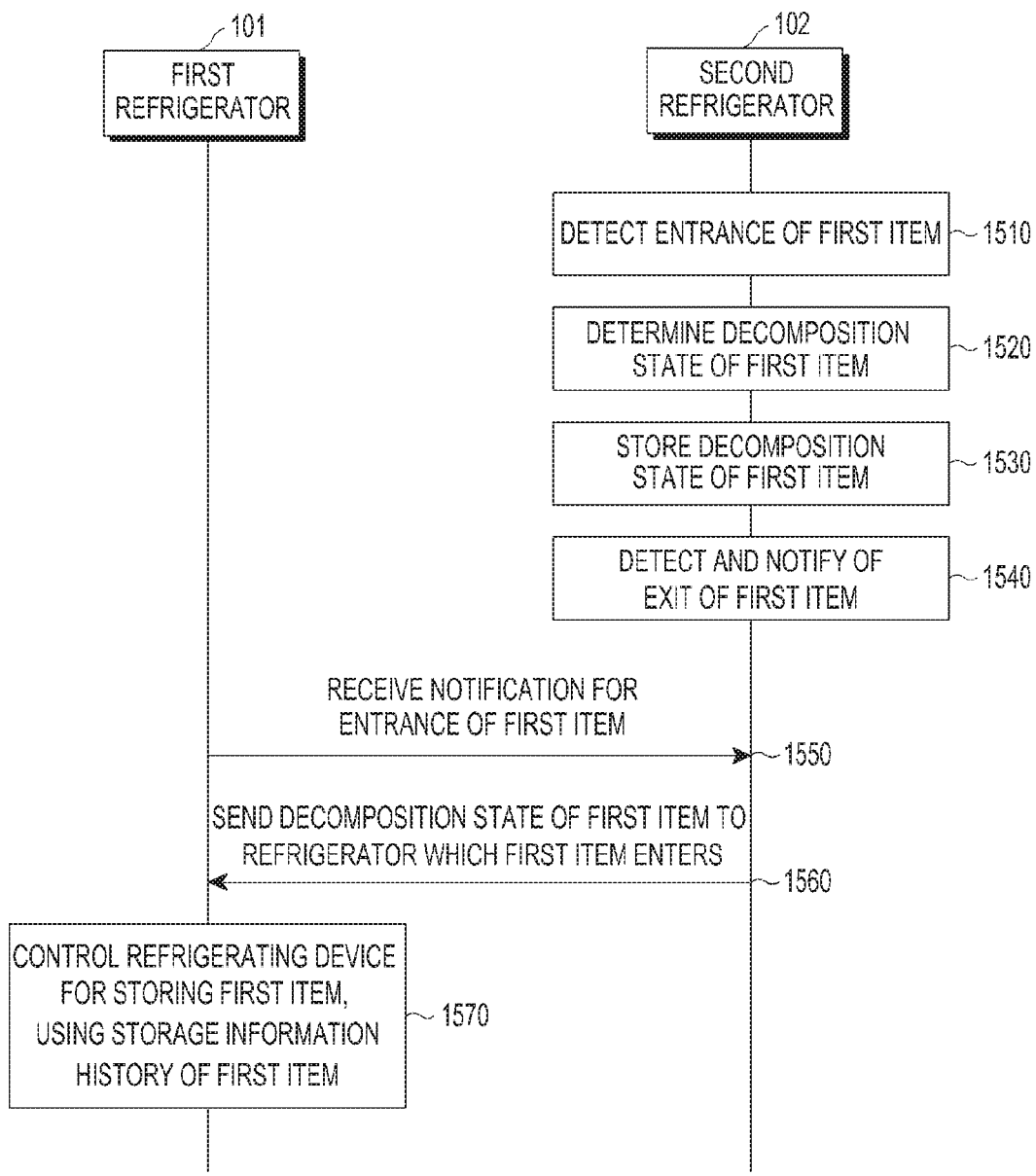
FIG. 15 illustrates an operation of a refrigerator according to various embodiments of the present disclosure.

FIG. 15 is a flowchart illustrating an operation of a refrigerator according to an embodiment of the present disclosure.

In operation 1510, the second refrigerator 102 may detect an entrance of the first item. In operation 1520, the second refrigerator 102 may determine a decomposition state of the first item. For example, the second refrigerator 102 may include a sensor for sensing a chemical corresponding to the decomposition state and may determine the decomposition state of the first item based on the sensed data. The decomposition state may include at least one of a decomposition time and decomposition degree. In operation 1530, the second refrigerator 102 may store the decomposition state of the first item.

In operation 1540, the second refrigerator 102 may detect and notify of an exit of the first item. In operation 1550, the second refrigerator 102 may receive the notification for an entrance of the first item. For example, the first refrigerator 101 may detect the entrance of the first item and send a signal including information on the entrance of the first item.

In operation 1560, the second refrigerator 102 may send the decomposition state of the first item to the refrigerator that the first item has entered. In operation 1570, the first refrigerator 101 may control the refrigerating device for storing the first item, using the decomposition state of the first item. Or, the first refrigerator 101 may generate an output for notifying of the decomposition state.

Figure 16:
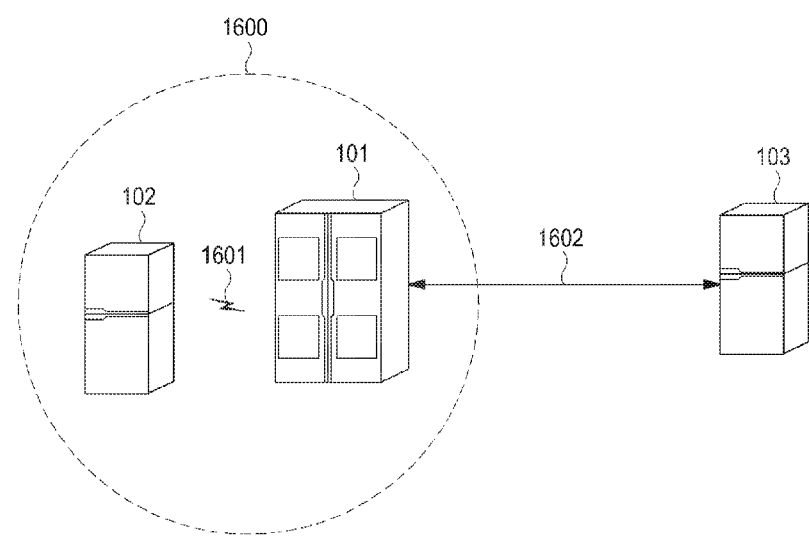
FIG. 16 illustrates a connection between refrigerators according to various embodiments of the present disclosure.

FIG. 16 is a concept view illustrating a connection between refrigerators according to an embodiment. As shown in FIG. 16, the first refrigerator 101 and the second refrigerator 102 may be included in a home network environment 1600. Here, the home network environment 1600 may mean communication coverage available by various short-range communication schemes or may mean an area that may be controlled by a control point (CP) in charge of the home network 1600. The first refrigerator 101 and the second refrigerator 102 may send and receive a signal 1601, and the signal 1601 may include storage information or information on an entrance or exit of an item. Or, the signal 1601 may include a storage information history or decomposition state.

Meanwhile, the first refrigerator 101 may remotely communicate with a third refrigerator 103 positioned outside the home network 1600. For example, the first refrigerator 101 may communicate with the third refrigerator 103 using long-distance communication using a cellular communication protocol. The first refrigerator 101 and the third refrigerator 103 may send and receive a signal 1602, and the signal 1602 may include storage information or information on an entrance or exit of an item. Or, the signal 1602 may include a storage information history or decomposition state.

Figure 17:
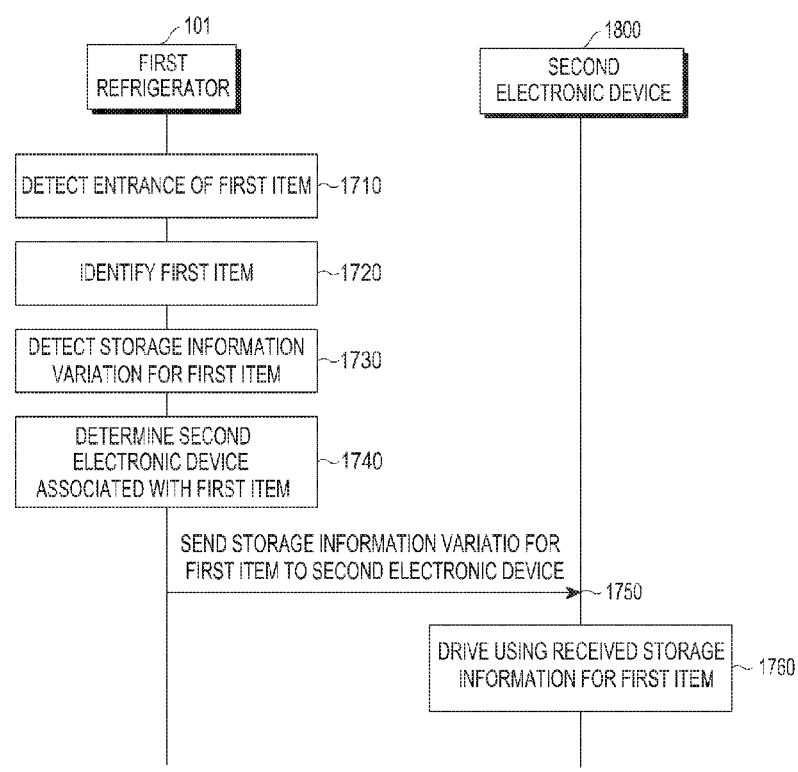
FIG. 17 illustrates an operation of a refrigerator according to various embodiments of the present disclosure.
Figure 18:
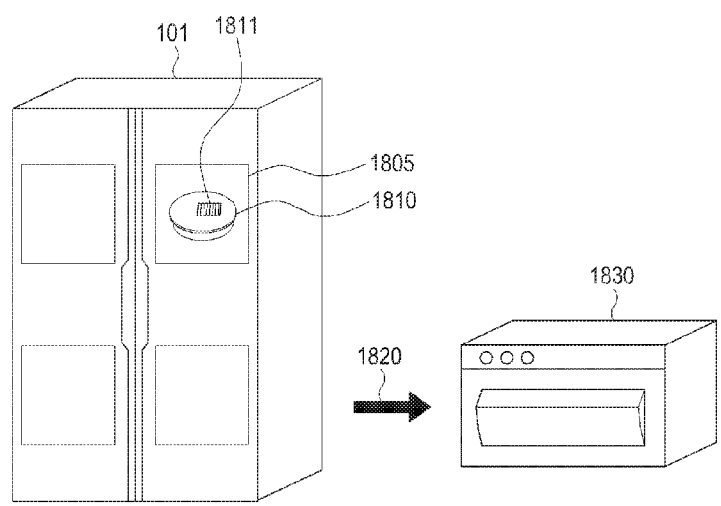
FIG. 18 illustrates an operation of a refrigerator according to various embodiments of the present disclosure.

FIG. 17 is a flowchart illustrating an operation of a refrigerator according to an embodiment of the present disclosure. An embodiment is described in detail with reference to FIG. 17 along with FIG. 18. FIG. 18 is a concept view illustrating an operation of a refrigerator according to an embodiment of the present disclosure.

In operation 1710, the first refrigerator 101 may detect an entrance of the first item. For example, as shown in FIG. 18, the first refrigerator 101 may haven the first item 1810 enter a first storage area 1805. In operation 1720, the first refrigerator 101 may identify the first item 1810. For example, the first refrigerator 101 may identify information on the first item 1810 based on a result of scanning a RFID tag 1811 attached on the first item 1810. For example, the first refrigerator 101 may identify the type of the first item 1810 as frozen beef.

In operation 1730, the first refrigerator 101 may detect a variation in storage information for the first item 601. For example, the first refrigerator 101 may receive a defrosting command for the first storage area 1805 that the first item 1810 has entered. Thus, the first refrigerator 101 may detect an increase in storage information on the first item 601, i.e., temperature information.

In operation 1740, the first refrigerator 101 may determine a second electronic device 1800 associated with the first item 1810. According to an embodiment of the present disclosure, the first refrigerator 101 may determine an electronic device corresponding to the variation in the storage information on the first item 1810. For example, in the embodiment shown in FIG. 18, the first refrigerator 101 may determine that the electronic device corresponding to the item 1810 is an oven 1830, corresponding to the increase in the temperature information. The first refrigerator 101 may store the defrosting command for the frozen beef in association with the oven and may thus determine that the oven 1830 is the electronic device corresponding to the item 1810, corresponding to the increase in the temperature information.

In operation 1750, the first refrigerator 101 may send the variation in the storage information on the first item to the second electronic device 1800, i.e., the oven 1830. In operation 1760, the second electronic device 1800, i.e., the oven 1830, may be driven using the received storage information on the first item. The oven 1830 may conduct preheating, which is a designated operation, corresponding to the increase in the temperature information. The oven 1830 may set a pre-heat temperature according to the degree of the increase in the temperature information. As described above, the user may cook with the first item 1810 in the pre-heated oven 1830 right after the first refrigerator 101 terminates defrosting the first item 1810.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes that are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing instructions configured to be executed by at least one processor to enable the processor to perform at least one operation that may include controlling at least one of a temperature and humidity of at least one storage area of a refrigerator based on first storage information, receiving, from a second refrigerator different from the refrigerator, second storage information of the second refrigerator, and controlling at least one of the temperature and the humidity of the at least one storage area of the refrigerator based on the received second storage information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a refrigerator, the method comprising:
    controlling at least one of a temperature and a humidity of at least one storage area of the refrigerator based on first storage information;
    receiving, by the refrigerator and from a second refrigerator different from the refrigerator, second storage information of a first item from the second refrigerator, wherein the second storage information comprises identification information of the first item that is obtained by the second refrigerator during an exit of the first item from the second refrigerator;
    obtaining, by the refrigerator, a storage area information based on the identification information of the first item entering into the refrigerator; and
    controlling at least one of the temperature and the humidity of the at least one storage area of the refrigerator based on the received second storage information and the obtained storage area information.

2. The method of claim 1, further comprising detecting an entrance of the first item, and
    wherein receiving the second storage information includes receiving the second storage information from the second refrigerator detecting the exit of the first item.

3. The method of claim 2, further comprising sending a first signal including information on the entrance of the first item, wherein the second refrigerator may send the second storage information corresponding to reception of the first signal.

4. The method of claim 2, wherein receiving the second storage information includes receiving a second signal including information on an exit of the first item from the second refrigerator and sending a third signal requesting the second storage information to the second refrigerator corresponding to reception of the second signal, and wherein the second refrigerator sends the second storage information corresponding to reception of the third signal.

5. The method of claim 2, wherein detecting the entrance of the first item includes obtaining the identification information of the first item and detecting the entrance of the first item based on a result of obtaining the identification information.

6. The method of claim 5, wherein receiving the second storage information includes receiving the second storage information from the second refrigerator detecting the exit of the first item based on the result of obtaining the identification information of the first item.

7. The method of claim 2, wherein detecting the entrance of the first item includes detecting an increase by a first amount in weight of the at least one storage area and detecting the entrance of the first item based on the increase by the first amount in weight.

8. The method of claim 7, wherein receiving the second storage information includes receiving the second storage information from the second refrigerator detecting the exit of the first item based on detection of a decrease by the first amount in weight.

9. The method of claim 2, wherein detecting the entrance of the first item includes detecting the entrance of the first item at a first time based on sensing data from a presence sensor detecting presence of an item included in the refrigerator.

10. The method of claim 9, wherein receiving the second storage information includes receiving the second storage information from the second refrigerator detecting the exit of the first item at a second time whose difference from the first time is within a predetermined threshold.

11. The method of claim 2, wherein the second storage information includes a storage information history for the first item, and wherein controlling at least one of the temperature and the humidity of the at least one storage area of the refrigerator includes controlling at least one of the temperature and the humidity of the at least one storage area of the refrigerator based on the storage information history for the first item.

12. The method of claim 2, wherein the second storage information includes a decomposition state for the first item, and wherein controlling at least one of the temperature and the humidity of the at least one storage area of the refrigerator includes controlling at least one of the temperature and the humidity of the at least one storage area of the refrigerator based on the decomposition state for the first item.

13. The method of claim 1, wherein the identification information comprises radio frequency identification (RFID) information.

14. A refrigerator, comprising:
    a refrigerating device configured to control at least one of a temperature and a humidity of at least one storage area of the refrigerator;
    a communication module;
    a processor electrically connected with the communication module and the refrigerating device; and
    a memory electrically connected to the processor, wherein the memory is configured to store instructions that when executed causes the processor to:
    control the refrigerating device based on first storage information,
    receive, by the communication module and from a second refrigerator different from the refrigerator, second storage information of a first item from the second refrigerator, wherein the second storage information comprises identification information of the first item that is obtained by the second refrigerator during an exit of the first item from the second refrigerator,
    obtain, by the refrigerator, a storage area information based on the identification information of the first item entering into the refrigerator, and control the refrigerating device based on the received second storage information and the obtained storage area information.

15. The refrigerator of claim 14, wherein the memory is further configured to store instructions that when executed cause the processor to detect an entrance of a first item, and wherein the communication module is configured to receive the second storage information from the second refrigerator detecting the exit of the first item.

16. The refrigerator of claim 15, wherein the communication module is further configured to send a first signal including information on the entrance of the first item, and wherein the second refrigerator is further configured to send the second storage information corresponding to reception of the first signal.

17. The refrigerator of claim 15, wherein the communication module is further configured to receive a second signal including information on the exit of the first item from the second refrigerator and send a third signal requesting the second storage information to the second refrigerator corresponding to reception of the second signal, and wherein the second refrigerator is further configured to send the second storage information corresponding to reception of the third signal.

18. The refrigerator of claim 15, further comprising a presence sensor configured to detect a presence of an item included in the refrigerator, wherein the memory is further configured to store instructions that when executed cause the processor to detect the entrance of the first item at a first time based on sensing data from the presence sensor.

19. The refrigerator of claim 14, wherein the identification information comprises radio frequency identification (RFID) information.

20. A method for controlling a second refrigerator, the method comprising:
  controlling a temperature and humidity of a storage area storing a first item based on first storage information;
  detecting, by the second refrigerator, an exit of the first item from the second refrigerator;
  obtaining, by the second refrigerator, identification information of the first item exiting the second refrigerator;
  receiving, by the second refrigerator, a first signal including the identification information of the first item from a refrigerator detecting the entrance of the first item in the refrigerator;
  sending, by the second refrigerator, the first storage information to the refrigerator corresponding to reception of the first signal; and
  controlling, by the second refrigerator, the temperature and humidity of the storage area previously storing the first item based on removing the first storage information.

* * * * *